(12) United States Patent
Bai et al.

(10) Patent No.: US 11,458,630 B2
(45) Date of Patent: Oct. 4, 2022

(54) MITIGATING REALITY GAP THROUGH SIMULATING COMPLIANT CONTROL AND/OR COMPLIANT CONTACT IN ROBOTIC SIMULATOR

(71) Applicant: X Development LLC, Mountain View, CA (US)

(72) Inventors: Yunfei Bai, Fremont, CA (US); Yuchen Wu, San Francisco, CA (US)

(73) Assignee: X DEVELOPMENT LLC, Mountain View, CA (US)

( * ) Notice: Subject to any disclaimer, the term of this patent is extended or adjusted under 35 U.S.C. 154(b) by 304 days.

(21) Appl. No.: 16/653,858

(22) Filed: Oct. 15, 2019

(65) Prior Publication Data
US 2021/0107157 A1    Apr. 15, 2021

(51) Int. Cl.
B25J 9/16    (2006.01)

(52) U.S. Cl.
CPC ............ B25J 9/1671 (2013.01); B25J 9/163 (2013.01); B25J 9/1605 (2013.01); B25J 9/1692 (2013.01); B25J 9/1694 (2013.01)

(58) Field of Classification Search
None
See application file for complete search history.

(56) References Cited

U.S. PATENT DOCUMENTS

| | | | |
|---|---|---|---|
| 9,811,074 B1 | 11/2017 | Aichele et al. | |
| 2013/0310979 A1* | 11/2013 | Herr | B62D 57/032 700/258 |
| 2014/0081461 A1* | 3/2014 | Williamson | B25J 9/1643 700/261 |
| 2016/0046023 A1* | 2/2016 | Nagendran | B25J 9/1689 700/248 |
| 2017/0282379 A1 | 10/2017 | Nakayama | |
| 2019/0084151 A1 | 3/2019 | Bai et al. | |

(Continued)

FOREIGN PATENT DOCUMENTS

WO    WO-2015134391 A1 *    9/2015    ........... G05B 19/427

OTHER PUBLICATIONS

Tsuneo Yoshikawa, Modeling of Flexible Manipulators Using Virtual Rigid Links and Passive Joints, 11-1991n IEEE. (Year: 1991).*

(Continued)

*Primary Examiner* — Jeff A Burke
*Assistant Examiner* — Arslan Azhar
(74) *Attorney, Agent, or Firm* — Middleton Reutlinger

(57) ABSTRACT

Mitigating the reality gap through utilization of technique(s) that enable compliant robotic control and/or compliant robotic contact to be simulated effectively by a robotic simulator. The technique(s) can include, for example: (1) utilizing a compliant end effector model in simulated episodes of the robotic simulator; (2) using, during the simulated episodes, a soft constraint for a contact constraint of a simulated contact model of the robotic simulator; and/or (3) using proportional derivative (PD) control in generating joint control forces, for simulated joints of the simulated robot, during the simulated episodes. Implementations additionally or alternatively relate to determining parameter(s), for use in one or more of the techniques that enable effective simulation of compliant robotic control and/or compliant robotic contact.

19 Claims, 8 Drawing Sheets

(56) References Cited

U.S. PATENT DOCUMENTS

2019/0176326 A1   6/2019   Bingham et al.
2019/0308315 A1   10/2019  Radrich et al.

OTHER PUBLICATIONS

European Patent Office; International Search Report and Written Opinion of Ser. No. PCT/US2020/055479; 23 pages; dated Mar. 24, 2021.
European Patent Office; Invitation to Pay Additional Fees in Ser No. PCT/US2020/055479; 18 pages; dated Feb. 3, 2021.
Smith, R.; "Open Dynamics Engine Vo. 5 User Guide;" retrieved from the internet: URL:http://ode.org/ode-latest-userguide.pdf; 98 pages; dated Feb. 23, 2006.
Siciliano, B. et al., "Chapter 9—Force Control;" In book "Robotics Modelling Planning and Control," Springer; pp. 363-406; Dec. 23, 2009.

* cited by examiner

MITIGATING REALITY GAP THROUGH SIMULATING COMPLIANT CONTROL AND/OR COMPLIANT CONTACT IN ROBOTIC SIMULATOR

BACKGROUND

Various machine learning based approaches to robotic control have been proposed. Some of those approaches train a machine learning model (e.g., a deep neural network model) that can be utilized to generate one or more predictions that are utilized in control of a robot, and train the machine learning model using training data that is based only on data from real-world physical robots. However, these and/or other approaches can have one or more drawbacks. For example, generating training data based on data from real-world physical robots requires heavy usage of one or more physical robots in generating data for the training data. This can be time-consuming (e.g., actually navigating a large quantity of paths requires a large quantity of time), can consume a large amount of resources (e.g., power required to operate the robots), can cause wear and tear to the robots being utilized, and/or can require a great deal of human intervention.

In view of these and/or other considerations, use of robotic simulators has been proposed to generate simulated robot data that can be utilized in generating simulated training data for training of the machine learning models. However, there is often a meaningful "reality gap" that exists between real robots and real environments—and the simulated robots and/or simulated environments simulated by a robotic simulator. This can result in generation of simulated training data that does not accurately reflect what would occur in a real environment. This can affect the performance of machine learning models trained on such simulated training data and/or can require a significant amount of real world training data to also be utilized in training to help mitigate the reality gap.

SUMMARY

Implementations disclosed herein relate to mitigating the reality gap through utilization of one or more techniques that enable compliant robotic control and/or compliant robotic contact to be simulated effectively by a robotic simulator. The technique(s) can include, for example: (1) utilizing a compliant end effector model in simulated episodes of the robotic simulator; (2) using, during the simulated episodes, a soft constraint for a contact constraint of a simulated contact model of the robotic simulator; and/or (3) using proportional derivative (PD) control in generating joint control forces, for simulated joints of the simulated robot, during the simulated episodes. Each of these techniques is described in more detail herein, and each can be used alone or in combination with other of the technique(s).

Some implementations disclosed herein additionally or alternatively relate to utilizing system identification and/or other techniques, in determining parameter(s) for use in one or more of the techniques (mentioned above) that enable effective simulation of compliant robotic control and/or compliant robotic contact.

As one example, some implementations relate to determining the soft constraint, for the contact constraint of the simulated contact model, through optimization of the soft constraint using system identification. For example, the soft constraint can be optimized based on comparing: (a) real world force values, from real instances of contact of the real end effector with real world objects; to (b) simulated force values from corresponding simulated instances of contact of the simulated end effector with corresponding simulated objects. A simulated instance, that corresponds to a real instance, is one in which the actions of the robot in the real instance and the environment of the real instance are simulated in the simulator. For example, control values from a real robotic episode can be replayed in a simulated robotic episode and with a simulated environment that mimics a real environment of the real episode, and an instance of the real episode and the simulated episode can correspond based on occurring after implementation of the same control value.

The simulated force value(s), utilized in each comparison in optimizing the soft constraint, can be generated using the robotic simulator with most recently optimized parameter(s). For instance, a loss can be generated based on comparing real world force value(s) to corresponding simulated force value(s) (generated using the robotic simulator and a previously updated soft constraint), and that loss value can be utilized by VIZIER or another black-box optimizer to determine, based on the loss, an updated soft constraint. Another iteration can then be performed in which the updated soft constraint is utilized by the robotic simulator in generating additional corresponding simulated force value(s) for comparison. This can continue for a large quantity of iterations until one or more conditions are satisfied, such as a threshold quantity of iterations occurring, convergence of the soft constraint, and/or other condition(s).

As another example, some implementations relate to determining parameter(s) for the compliant end effector model, such as constant(s) of spring(s) utilized in the compliant end effector model, through optimization of the parameter(s) using system identification. For example, the constant can be optimized through iterations of comparing (a) real world force values, from real instances of contact of the real end effector with real world objects, and (b) simulated force values from corresponding simulated instances of contact of the simulated end effector with corresponding simulated objects (e.g., each of the simulated force values can be generated using most recently optimized parameter(s)).

As yet another example, some implementations relate to determining gain(s) for the PD control, through optimization of the gain(s) using system identification. For instance, the gain(s) can be optimized by comparing (a) real world pose values (e.g., poses of the end effector), from real episodes of the real robot, and (b) simulated pose values from corresponding simulated episodes of the simulated robot (e.g., each of the simulated pose values can be generated using most recently optimized parameter(s)). In some implementations, at least an initial optimization of the gain(s) can be determined prior to determining optimization(s) of the soft constraint for the contact model and/or of the constant(s) for the spring(s) of the compliant end effector model. In some of those implementations, the soft constraint for the contact model and the constant(s) for the spring(s) of the compliant end effector model can be optimized jointly (i.e., in the same system identification).

Simulated data, that is generated utilizing a robotic simulator employing technique(s) disclosed herein can accurately reflect "real world data". For example, such simulated data can be closer to "real world data" than if such technique(s) were not employed. Additionally or alternatively, such simulated data, when utilized to train machine learning model(s) (e.g., neural network model(s) and/or other machine learning model(s)) that are then deployed on a real robot for control of the real robot, can result in improved real robotic control in performance of task(s) (e.g., a higher success rate for the task(s)) by a real robot that utilizes the machine learning model(s) in performance of the task(s). The machine learning model(s) trained based on such simulated training data can include, for example, a control policy model used in controlling a real physical robot during performance of one or more robotic tasks, such as robotic navigation tasks, object manipulation tasks (e.g., grasping), and/or other robotic task(s).

In various implementations, a lesser quantity of (or no) real training data can be utilized as a result of improved (e.g., more realistic) simulated training data that is generated by the robotic simulator employing technique(s) disclosed herein. Utilizing a lesser quantity of (or no) real training data can reduce resources that would otherwise be consumed by real-world physical robots in generating a greater quantity of real training data, can cause less wear and tear to real-world physical robots as a result of generating a lesser quantity of (or no) real training data, can lead to an increase in time-efficiency in generating training data (e.g., simulated episodes can be performed in less clock on the wall time than real-world episodes), and/or can achieve additional and/or alternative benefits. In other words, bridging the reality gap according to various techniques disclosed herein can mitigate sim-to-real transfer problems and lead to improved performance of real robots that utilize machine learning model(s) trained according to techniques disclosed herein.

As mentioned above, some implementations utilize a compliant end effector model in simulated episodes of the robotic simulator. In some of those implementations, the compliant end effector model corresponds to a real end effector of a counterpart real robot. The counterpart real robot, as used herein, can reference a large quantity of real robots that all have same and/or similar hardware configurations (e.g., the same or similar end effector(s)). For example, the counterpart real robot can be one or more similar models of a robot, for which the robotic simulator is being utilized (e.g., to generate training data for training a machine learning model to be deployed in the model(s) of the robot).

The utilized simulated end effector can include a simulated portion that corresponds to a real portion of the real end effector, where the real portion is deformable. For example, the real portion can be one or more flexible plastic bodies, flexible rubber bodies, and/or other flexible body or bodies. The real portion can be, for example, a gripping surface of a digit/finger of a gripper, when the real end effector is a gripper end effector. Despite the simulated portion corresponding to the real portion, it can differ from the real portion so as to be utilizable in simulation, while still accurately simulating the compliance of the real portion. For example, the real portion can include one or more real flexible bodies, while the simulated portion can instead include only simulated rigid bodies with simulated rotational spring(s) or other simulated resistive joint interconnecting pairs of the simulated rigid bodies. For instance, the simulated portion can lack any simulated flexible bodies and instead include two simulated rigid bodies that are joined with a simulated rotational spring. Also, for instance, the simulated portion can lack any simulated flexible bodies and instead include four simulated rigid bodies that are joined with three simulated rotational springs (i.e., a corresponding simulated rotational spring interposed between each pair of simulated rigid bodies). Utilization of the simulated rigid bodies joined with simulated rotational spring(s) can enable simulated compliance of the simulated end effector when the simulated end effector is in contact with a simulated environmental object, despite the simulated end effector including the simulated rigid bodies in lieu of flexible body/bodies. Accordingly, in these and other manners, simulated compliance of the end effector can be achieved in simulation, despite some or all portions thereof being modeled as rigid bodies/links. As described herein, a force constant of a simulated rotational spring of a compliant end effector model can optionally be determined utilizing system identification and/or other optimization technique(s).

As also mentioned above, some implementations utilize, during simulated episodes, a soft constraint for a contact constraint of a simulated contact model of the robotic simulator. Often, in simulation, a hard contact constraint is utilized such that, when the simulated end effector is in contact (e.g., with a surface), actual motion of the simulated end effector is stopped despite simulated commands still being provided to further move the target pose of the simulated end effector. This can result in a large simulated contact force of the simulated end effector (as a result of the continuing commands to further move the target pose), which may not correspond to real world forces. In view of these and other considerations, a soft contact constraint is utilized for a simulated contact model of the robotic simulator. Using the soft constraint enables penetration of the simulated end effector into simulated environmental objects during instances of contact.

In some implementations, the soft constraint can be controlled by an error reduction parameter (ERP) or a constraint force mixing (CFM) value. In some of those implementations, the contact model is implemented in simulation as a linear complementarity problem (LCP) together with other constraint(s) (e.g. joint limit constraint(s)) and is solved with sequential impulse (e.g., using a PGS solver). As described herein, the soft constraint utilized in the contact model during simulation can optionally be determined utilizing system identification and/or other optimization technique(s).

As also mentioned above, some implementations utilize, during simulated episodes, PD control in generating joint control forces, for simulated joints of the simulated robot. Those implementations control the simulated robot based on the joint control forces generated using the PD control. Often, in simulated robotic control, the simulated control is based on position constraints, that are converted to velocity constraints and solved together with other constraints. For example, control can also be implemented in simulation as an LCP problem and solved with sequential impulse. Control based on position constraints can be considered as implicit solve, and enables control that is very accurate and stable, but has the drawback of being very stiff. In contrast, implementations disclosed herein utilized PD control and solve the joint control forces explicitly. This can result in less stiff control that corresponds more closely with real world control. The PD control gains that are utilized are tuned (e.g., optimized as described herein) so as to avoid overshoot and/or instability.

As used herein, the "reality gap" is a difference that exists between real robots and real environments—and simulated robots and simulated environments simulated by a robotic simulator. Implementations disclosed herein present various techniques for mitigating the reality gap for a robotic simulator and more particularly, for mitigating the reality gap through training and utilization of a difference model, for modifying simulated state data instances to make them more akin to real world data instances.

The above description is provided as an overview of some implementations of the present disclosure. Further description of those implementations, and other implementations, are described in more detail below.

In some implementations, a method is provided that includes performing a simulated episode, using a robotic simulator that includes a simulated environment and a simulated robot that simulates a counterpart real robot. Performing the simulated episode includes simulating an end effector, of the simulated robot, that corresponds to a real end effector of the counterpart real robot. The simulated end effector includes a simulated portion that corresponds to a real portion of the real end effector. The simulated portion includes at least two simulated rigid bodies that are joined with at least one rotational spring. The at least two simulated rigid bodies that are joined with the at least one rotational spring simulate one or more real deformable bodies, of the real portion of the real end effector. Performing the simulated episode further includes controlling the simulated robot to cause one or more instances of contact of the simulated end effector with one or more simulated environmental objects of the environment. The method further includes using simulated data, from the simulated episode, in training one or more machine learning models to be deployed on the counterpart real robot.

These and other implementations of the technology disclosed herein can include one or more of the following features.

In some implementations, performing the simulated episode further includes using, during the simulated episode, a soft constraint for a contact constraint of a simulated contact model of the robotic simulator. Using the soft constraint can enable penetration of the simulated end effector into the one or more simulated environmental objects during the one or more instances of contact. The soft constraint can be, for example, controlled by an error reduction parameter (ERP) or a constraint force mixing (CFM) value. In versions that use the soft constraint, the method further includes performing a system identification to determine the soft constraint. Performing the system identification can include generating the soft constraint based on performing an optimization based on comparisons of: real world force values from real instances of contact of the real end effector with real world objects, and simulated force values from corresponding simulated instances of contact of the simulated end effector with corresponding simulated objects. In some of the versions that perform the system identification to determine the soft constraint, the method further includes determining at least one force constant, for the at least one rotational spring, based on performing the optimization and along with determining the soft constraint. In some additional or alternative versions that perform the system identification to determine the soft constraint, controlling the simulated robot includes: using proportional derivative (PD) control in generating joint control forces for simulated joints of the simulated robot; and controlling the simulated robot based on the joint control forces generated using the PD control. In some implementations that utilize PD control, the method further includes: performing an additional system identification to determine gains for the PD control. Performing the additional system identification can include generating the gains for the PD control based on performing an additional optimization based on comparisons of: real pose values of the counterpart real robot during corresponding control episodes of the counterpart real robot, and simulated pose values from corresponding simulated episodes of the simulated robot. Optionally, performing the additional system identification to determine the gains for the PD control occurs subsequent to performing the system identification to determine the soft constraint.

In some implementations, controlling the simulated robot includes: using proportional derivative (PD) control in generating joint control forces for simulated joints of the simulated robot; and controlling the simulated robot based on the joint control forces generated using the PD control. In some of those implementations, the method further includes performing a system identification to determine gains for the PD control. Performing the additional system identification can include generating the gains for the PD control based on performing an optimization based on comparisons of: real pose values of the counterpart real robot during corresponding control episodes of the counterpart real robot, and simulated pose values from corresponding simulated episodes of the simulated robot.

In some implementations, the simulated end effector is a simulated end effector gripper having a plurality of simulated digits. In some of those implementations, the simulated portion is a simulated digit of the plurality of simulated digits, the real end effector is a real end effector gripper having a plurality of real digits, and the real portion is a real digit of the plurality of real digits. Optionally, the one or more real deformable bodies are all or part of a gripping surface of the real digit and/or the one or more real deformable bodies consist of a single real deformable body.

In some implementations, the method further includes: training the one or more machine learning models based on the simulated training data; and transmitting the one or more machine learning models for use in control of the counterpart real robot.

In some implementations, the at least two simulated rigid bodies include four rigid bodies and wherein the at least one rotational spring includes three rotational springs, and each of the three rotational springs interconnects a corresponding pair of the four rigid bodies.

In some implementations, a method is provided that includes performing a simulated episode, using a robotic simulator that includes a simulated environment and a simulated robot that simulates a counterpart real robot. Performing the simulated episode includes simulating an end effector, of the simulated robot, that corresponds to a real end effector of the counterpart real robot. Performing the simulated episode further includes using, during the simulated episode, a soft constraint for a contact constraint of a simulated contact model of the robotic simulator. Performing the simulated episode further includes controlling the simulated robot to cause one or more instances of contact of the simulated end effector with the one or more simulated environmental objects. Controlling the simulated robot includes: using proportional derivative (PD) control in generating joint control forces for simulated joints of the simulated robot; and controlling the simulated robot based on the joint control forces generated using the PD control. The method further includes using simulated data, from the simulated episode, in training one or more machine learning models to be deployed on the counterpart real robot.

These and other implementations of the technology disclosed herein can include one or more of the following features.

In some implementations, performing the simulated episode further includes using, during the simulated episode, a soft constraint for a contact constraint of a simulated contact model of the robotic simulator. Using the soft constraint can enable penetration of the simulated end effector into the one or more simulated environmental objects during the one or more instances of contact. Optionally, the soft constraint is controlled by an error reduction parameter (ERP) or a constraint force mixing (CFM) value. In some implementations that use the soft constraint, the method further includes performing a system identification to determine the soft constraint. In some of those implementations, performing the system identification includes generating the soft constraint based on performing an optimization based on comparisons of: real world force values from real instances of contact of the real end effector with real world objects, and simulated force values from corresponding simulated instances of contact of the simulated end effector with corresponding simulated objects.

In some implementations, the method further includes performing a system identification to determine gains for the PD control. In some of those implementations, performing the system identification includes generating the gains for the PD control based on performing an optimization based on comparisons of: real pose values of the counterpart real robot during corresponding control episodes of the counterpart real robot, and simulated pose values from corresponding simulated episodes of the simulated robot.

In some implementations, the method further includes: training the one or more machine learning models based on the simulated training data; and transmitting the one or more machine learning models for use in control of the counterpart real robot.

Other implementations can include a non-transitory computer readable storage medium storing instructions executable by one or more processors (e.g., central processing unit(s) (CPU(s)), graphics processing unit(s) (GPU(s)), and/or tensor processing unit(s) (TPU(s)) to perform a method such as one or more of the methods described above and/or elsewhere herein. Yet other implementations may include a system of one or more computers and/or one or more robots that include one or more processors operable to execute stored instructions to perform a method such as one or more of the methods described above and/or elsewhere herein.

DETAILED DESCRIPTION

Training of machine learning models that are robust and accurate, and that can be utilized for control of real-world physical robots, is often limited by the scalability of using real-world physical robots to generate a sufficient quantity of training data and/or to generate training data that is sufficiently diverse. Implementations described herein present techniques for mitigating the reality gap between a robotic simulator, and real-world physical robot(s) and/or a real-world environment through utilization of utilization of one or more techniques that enable compliant robotic control and/or compliant robotic contact to be simulated effectively by the robotic simulator. The technique(s) can include, for example: (1) utilizing a compliant end effector model in simulated episodes of the robotic simulator; (2) using, during the simulated episodes, a soft constraint for a contact constraint of a simulated contact model of the robotic simulator; and/or (3) using PD control in generating joint control forces, for simulated joints of the simulated robot, during the simulated episodes. Utilizing such technique(s) with a robotic simulator enables generation of simulated data that can be used in training of one or more machine learning models that can be used in the control of real-world physical robots. Such simulated data can be improved (e.g., more realistic) relative to simulated data that isn't generated utilizing such technique(s). This can enable training of a robust and/or accurate machine learning model, while reducing a quantity of real-world training data that is also utilized in training the machine learning model—or even eliminating the need for use of real-world training data in training of the machine learning model.

Figure 1:
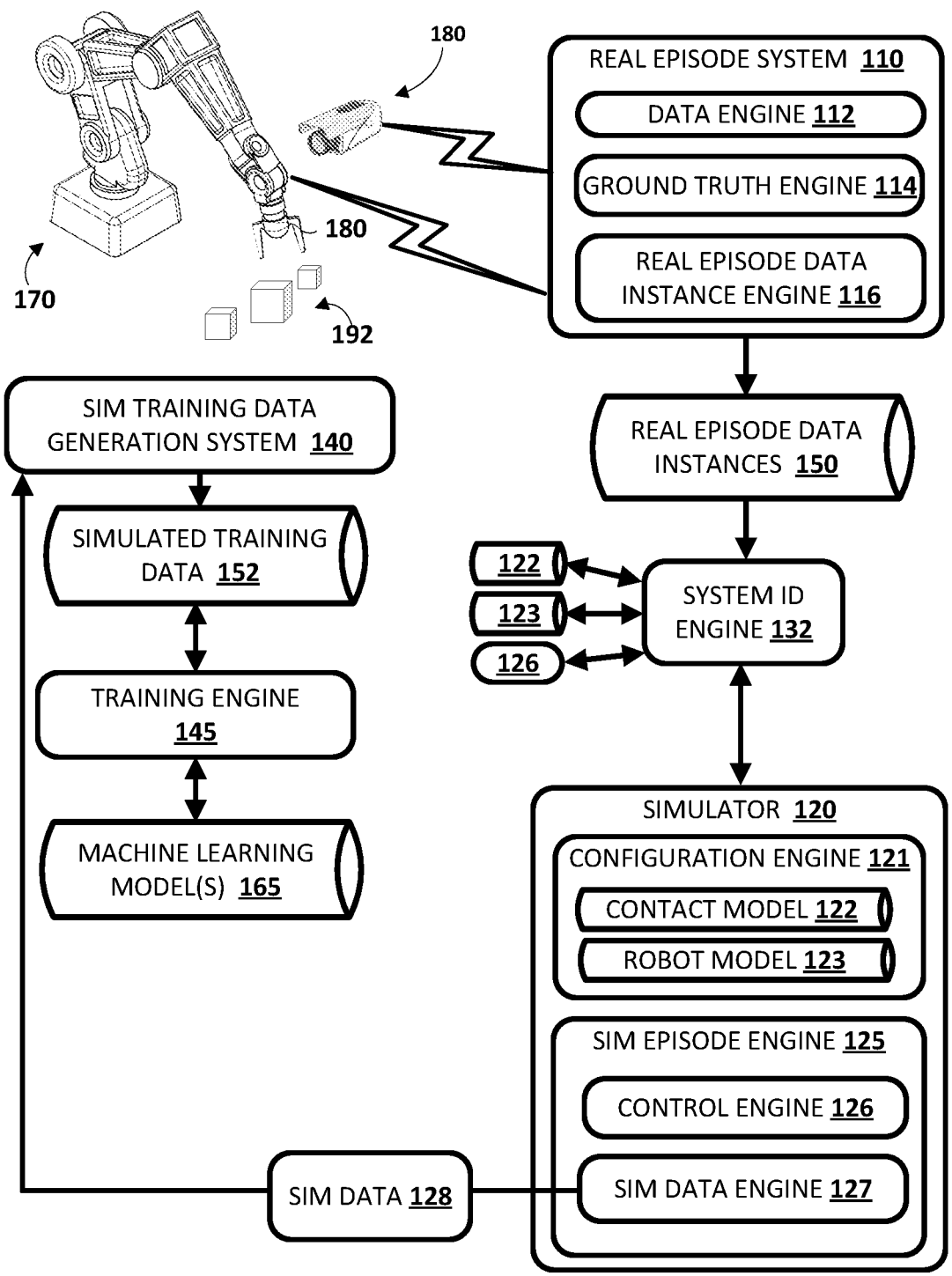
FIG. 1 illustrates an example environment in which implementations described herein can be implemented.

Turning now to the figures, FIG. 1 illustrates an example environment in which implementations described herein can be implemented. FIG. 1 includes an example robot 170, a motion capture system 180, a real episode system 110, a robotic simulator 120, a system identification (ID) engine 132, a simulator (sim) training data generation system 140, and a training engine 145. Also included are real episode data instances 150, simulated training data 152, and one or more machine learning models 165.

Robot 170 is a "robot arm" having multiple degrees of freedom to enable traversal of grasping end effector 180 along any of a plurality of potential paths to position the grasping end effector 180 in desired locations. Robot 170 further controls two opposed "claws" of grasping end effector 180 to actuate the claws between at least an open position and a closed position (and/or optionally a plurality of "partially closed" positions). Environmental objects 192 are also illustrated in FIG. 1 as various sized blocks, and can be interacted with (e.g., pushed, pulled, grasped) by the robot 170 during an episode. Other environmental object(s) can be included in addition to and/or in lieu of those illustrated in the example of FIG. 1. For example, additional and/or alternative objects 192 can be included such as a spatula, a stapler, a pencil, plates, and/or any other objects. Also, although a particular robot 170 is illustrated in FIG. 1, additional and/or alternative robots may be utilized, including additional robot arms that are similar to robot 170, robots having other robot arm forms, robots having a humanoid form, robots having an animal form, robots that move via one or more wheels, an unmanned aerial vehicle ("UAV"), and so forth. Also, although a particular grasping end effector 180 is illustrated in FIG. 1, additional and/or alternative end effectors may be utilized (or even no end effectors), such as alternative impactive grasping end effectors (e.g., those with grasping "plates", those with more or fewer "digits"/"claws"), "ingressive" grasping end effectors, "astrictive" grasping end effectors, or "contiguity" grasping end effectors, or non-grasping end effectors.

Robot 170 and/or other robots can be utilized to perform real episodes of one or more robotic tasks, and data associated with the episodes can be utilized by the real episode system 110 to generate real episode data instances 150. The real episode data instances 150 can be stored by the real episode system 110 in one or more computer-readable media (e.g., one or more databases). In some implementations, all or aspects of real episode system 110 can be implemented on robot 170 (e.g., via one or more processors of robot 170). In some implementations, all or aspects of real episode system 110 can be implemented on one or more computing devices that are separate from, but in network communication with, robot 170. As described in more detail herein, the real episode data instances 150 can be utilized, by the system ID engine 132, in optimizing of parameter(s) for the contact model 122, the robot model 123, and/or for the control engine 126 of the robot simulator 120.

During each real episode, the robot 170 (or another robot) is controlled to cause the robot to perform a corresponding robotic task, such as a movement task, a manipulation task, a navigation task (e.g., for robots that have wheel(s), leg(s), and/or other means of locomotion). Different robotic tasks can be performed in different real episodes. The control of the robot 170 during an episode can be random, pseudo-random, and/or dictated by one or more control policies. As one non-limiting example, the robotic task can be a grasping task where the robot 170 attempts to grasp one (e.g., any one) of the objects 192 utilizing the end effector 180. For instance, at the start of each episode, the robot 170 can be in a corresponding starting pose (e.g., a pseudo-randomly determined pose). At each time step of the episode, a robot action can be determined (e.g., randomly or pseudo-randomly determined) and implemented that causes the end effector 180 to move (e.g., translationally and/or rotationally). At one or more final time steps of the episode, the end effector 180 can be actuated to attempt a grasp. For instance, the two grasping digits of the end effector 180 can be actuated to cause them to "close" (e.g., move closer together) until they are touching, are applying at least a threshold level of force, and or other criterion/criteria are satisfied.

The data engine 112 of the real episode system 110 stores, for each real episode, the sequence of actions generated to control the robot 170 during the real episode. The sequence of actions can be generated by the robot 170, and provided to the real episode system 110 by the robot 170. In some implementations, the sequence of actions can be low-level actions, such as control command(s) issued to actuators of the robot 170 during the real episode. For example, the robot 170 can include a controller that translates higher level commands into more specific control commands to provide to one or more actuators of the robot 170 during a real episode. The control commands can include one or more joint control force(s) issued to actuator(s) of the robot 170 at a corresponding instance, to control movement of the robot 170 during the real episode. For example, in controlling movement of the robot 170, joint control forces can be issued to each of the actuators that control movement of the end effector 180. Using the joint control forces or other lower-level control commands, instead of higher-level control commands, enables the joint control forces to be utilized in simulation to remove any reality gap impacts that may be present in simulated controllers that would translate the higher level control commands to the velocity control instances.

The data engine 112 also optionally stores, for each real episode, environmental data for the real episode. The environmental data can define the beginning state of one or more environmental objects at the beginning of the real episode and/or one or more other properties for one or more environmental objects. For example, the environmental data can define: a beginning pose (e.g., full 6D pose) of each of the objects 192; size, shape, weight, and/or material for each of the objects 192; topological and/or friction properties for a surface (unillustrated) on which the objects 192 rest; and/or other environmental properties. The beginning state of environmental object(s) can be determined, for example, utilizing vision data from the motion capture system 180, vision data from a vision component (unillustrated) of the robot 170, and/or using human measurements.

The ground truth engine 114 of the real episode data system generates one or more ground truth values for each real episode. The ground truth value(s) for a real episode can be generated by the ground truth engine 114 based on data from the robot 170, data from motion capture system 180, and/or data from human measurements. Generated ground truth value(s) are also included in a real episode data instance. Each of the ground truth values defines, for a corresponding point of the real episode, a corresponding measured value for each of one or more properties of the real robot. For example, a ground truth value can define a pose and/or velocity of an end effector of the robot and/or a position and/or velocity for each of a plurality of actuators that control the pose of the end effector. Also, for example, a ground truth value can define contact force being applied, by the robot, to an environmental object (e.g., based on reading(s) from force sensor(s) of the robot). Each of the ground truth values is for a corresponding point of the real episode and can be correlated to that point through assignment to a corresponding action and/or to a corresponding timestamp of the real episode. It is noted that, in various implementations, the ground truth engine 114 can generate a first quantity of ground truth values for a real episode, where the first quantity is less than a second quantity of actions (stored by the data engine 112) for the real episode. For example, there can be a sequence of 500 velocity control instances (actions) for a real episode, and all 500 velocity control instances can be stored. However, there can be only 1, 5, 10, or other quantity of ground truth values generated and stored.

In some implementations, the ground truth engine 114 generates all or part of a ground truth value based on data provided by the robot 170. For example, as the robot 170 moves during an episode, sensor data generated by sensors of the robot can be used to generate ground truth pose values, ground truth force values, and/or other ground truth values. In some implementations, the ground truth engine 114 generates all or part of a ground truth value based on data provided by the motion capture system 180. Motion capture system 180 is external to the robot 170 and includes a vision component (e.g., high-speed camera) to capture vision data (e.g., images). The vision component of the motion capture system 180 has a field of view of at least a portion of the real environment of the robot 170. The vision component can be attached at a fixed location in the environment, but can optionally be adjustable. The vision component of the motion capture system 180 can be, for example, a monographic camera (e.g., generating 2D RGB images), a stereographic camera (e.g., generating 2.5D RGB images), a laser scanner (e.g., generating 2.5D "point clouds"), and/or a high-speed camera (e.g., generating 2D RGB images of reflective markers) and can be operatively connected to one or more systems (e.g., the real episode system 110) disclosed herein. Vision data can be captured by one or more vision components of motion capture system 180 during a real episode. The vision data can be processed by the motion capture system 180, and/or the real episode data system 110 to generate one or more values for utilization in ground truth data instance(s) for the real episode. The value(s) generated based on such data can include pose(s) of the real robot 170 (e.g., including position and orientation components), one or more velocities of the real robot 170, and/or other values that are each a measured property of the robot 170 and/or environmental object(s) 192 at a corresponding point in time.

The real episode data instance engine 116 generates a real episode data instance based on a continuous sequence of at least a portion of the actions from the robot data engine 112 for a corresponding real episode, and based on ground truth value(s), from the ground truth engine 114, that correspond to those actions. The real episode data instance engine 116 can correlate actions and ground truth values based on, for example, corresponding timestamps of the actions and the ground truth values. For example, the real episode data instance engine 116 can correlate a ground truth value to an action (or a corresponding time) based on a timestamp for the ground truth value being most proximal to a timestamp for the action (or the corresponding time).

For a given real episode, the real episode data instance engine 116 can generate one or multiple real episode data instances. For example, a given real episode can have a 10 second duration and a first real episode data instance can be generated that includes actions for the entire duration, and corresponding ground truth value(s). Further, a second real navigation data instance can be generated that includes actions for only a first portion of the duration (e.g., from 2.5 seconds in, until 8.0 seconds in), and corresponding ground truth value(s).

The simulator 120 is a robotic simulator implemented by one or more computer systems and is used to simulate an environment that includes corresponding environmental object(s), to simulate a robot operating in the simulated environment (e.g., to simulate robot 170), to simulate responses of the simulated robot in response to virtual implementation of various simulated robotic actions, and to simulate interactions between the simulated robot and the simulated environmental objects in response to the simulated robotic actions. Various simulators can be utilized, such as physics engines that simulates collision detection, soft and rigid body dynamics, etc. One non-limiting example of such a simulator is the BULLET physics engine.

The simulator 120 includes a configuration engine 121. The configuration engine 121 configures various parameters for a simulated environment of the simulator 120 and/or configures various parameters for a simulated robot of the simulator 120. For example, the simulator 120 can include and utilize a contact model 122, and the configuration engine 121 can configure parameter(s) of the contact model 120. For instance, the configuration engine 121 can configure a contact constraint, for the contact model 120, to be a soft constraint as described herein. In some implementations, the soft constraint can be one that is optimized, as determined by system ID engine 132 (described in more detail below). In some implementations, the soft constraint can be controlled by an error reduction parameter (ERP) or can be a constraint force mixing (CFM) value. In some of those implementations, the contact model 122 is implemented in simulation as an LCP and is solved with sequential impulse.

As another example, the simulator 120 can include and utilize a robot model 123. The robot model 123 can define the physical construct of the simulated robot, as well as constraints of the simulated robot, a dynamic model of the simulated robot, and/or other parameter(s) of the simulated robot. For instance, the robot model 123 can define the physical construct of the simulated robot, including at least the physical construct of simulated end effector(s) of the simulated robot. In some implementations, the configuration engine 121 can utilize, in the robot model 123, a compliant end effector model as described herein. In some of those implementations, the compliant simulated end effector model corresponds to a real end effector of a counterpart real robot, and includes a simulated portion that corresponds to a deformable real portion of the real end effector. Despite the simulated portion corresponding to the real portion, it can differ from the real portion so as to be utilizable in simulation, while still accurately simulating the compliance of the real portion. For example, the real portion can include one or more real flexible bodies, while the simulated portion can instead include only simulated rigid bodies with simulated rotational spring(s) or other simulated resistive joint interconnecting the simulated rigid bodies. One non-limiting example of a compliant simulated end effector model is described in more detail below with reference to FIGS. 2A, 2B, and 4. Further, a non-limiting example, of a corresponding counterpart real end effector, is described in more detail below with reference to FIGS. 3A and 3B. In some implementations, force constant(s) of spring(s) of the compliant simulated end effector model, and/or other parameter(s) of the compliant simulated end effector model, can be optimized value(s) as determined by system ID engine 132 (described in more detail below).

The configuration engine 121 can also, prior to performance of a simulated episode, configure various simulated environmental properties for the simulated episode. For example, the configuration engine 121 can determine what simulated environmental object(s) are included in the simulated environment, the starting pose(s) of those object(s), etc.

In situations where the simulator 120 is being utilized by system ID engine 132 to perform a simulated episode instance that is based on a real episode instance, the configuration engine 121 can adapt the simulated environment of the simulator in accordance with environmental data included in the real episode data instance (i.e., to have the simulated episode instance environment mimic that of the real episode instance). For example, the environmental data can define environmental objects and the beginning state of the environmental objects. The configuration engine 121, for the simulated episode instance, can adapt the simulated environment to include simulated objects that conform to the environmental objects of the real episode instance, and to include them in the beginning state.

The simulated episode engine 125 of the simulator 120 is utilized to perform simulated episodes in which the simulated robot interacts with one or more simulated environmental objects. The simulated episode engine 125 can include a control engine 126 and a sim data engine 127. The control engine 126 controls the simulated robot during simulated episodes. In various implementations, the control engine 126 utilizes, during simulated episodes, PD control in generating joint control forces, for simulated joints of the simulated robot. In those implementations, the control engine 126 controls the simulated robot based on the joint control forces generated using the PD control. This can result in less stiff control that corresponds more closely with real world control. In some implementations, the PD control gains that are utilized in the PD control are ones optimized using system ID engine 132 (described in more detail below).

The simulated data engine 127 of the simulated episode engine 125 generates simulated data 128 for simulated episodes, where each instance of simulated data defines all or aspects of the predicted state of the simulator 120, following implementation of a corresponding action. For example, a given instance of simulated data 128 can define: a corresponding simulated value for each of one or more properties of the simulated robot, and/or a corresponding simulated state for each of one or more simulated environmental objects interacted with by the simulated robot.

The sim data 128 can be utilized by sim training data generation system 140 to generate corresponding simulated training data 152. Training data 152 can be utilized by training engine 145 in training of one or more machine learning models 160. For example, the training engine 145 can process simulated training data 152 to generate simulated training example input and simulated training example output, process the simulated training example input of the simulated training example using one of the machine learning model(s) 160, generate a predicted output based on the processing, compare the predicted output to the simulated training example output of the simulated training example, and update the machine learning model based on the comparison. For instance, the training engine 145 can determine an error based on the comparison and update the machine learning model by backpropagating the error over all or portions of the machine learning model. As another example, the training engine 145 can utilize the simulated training data 152 in training of one or more machine learning models using reinforcement learning.

System ID engine 132 utilizes system identification and/or other techniques, in determining parameter(s), for use, by the simulator 120, that mitigate the reality gap and more effectively model compliant control and/or compliant contact. The parameter(s) determined by the system ID engine 132 can include, for example, a soft constraint for contact model 122, force constant(s) for spring(s) included in compliant end effector model(s) of robot model 123, and/or gain(s) for use by control engine 126.

System ID engine 132 can cause simulator 120 to replay the robotic actions of real episode data instances 150, while iteratively optimizing parameter(s) utilized by the simulator 120. Optimizing the parameters can be based on comparing simulated value(s) generated by the simulator 120 during replay of the robotic actions, to corresponding ground truth values from the real episode data instances 150. In replaying a real episode data instance, system ID engine 132 can cause configuration engine 121 to configure all or aspects of the simulated environment in accordance with environmental properties included in the real episode data instance. Further, the system ID engine 132 can cause the contact model 122 and/or the robot engine 123 to utilize parameter(s) (e.g., soft contact constraint and spring force constant(s)) as optimized in a most recent system ID iteration. Yet further, the system ID engine 132 can cause the control engine 126 to implement all or portions of the real episode data instance, using parameter(s) (e.g., gain(s)) as optimized in a most recent system ID iteration. Ground truth value(s) of the real episode data instance can then be compared, by the system ID engine 132, to corresponding simulated data, and the parameter(s) optimized based on the comparison.

This process can be repeated, by the system ID engine 132, until one or more conditions are satisfied, such as one or more of the conditions described herein. Through the iterative optimization of the parameter(s), the parameter(s) collectively cause the simulator 120 to generate, when utilizing those parameter(s), simulated data that more accurately reflects real world data, including more accurately reflecting real world compliance in contact and/or control. The simulator 120, with the optimized parameter(s) 120, can then be utilized to generate sim data 128 that can be used to train the machine learning model(s) 165 as described above. In some implementations, in optimizing the parameter(s), system ID engine 132 can perform some or all of the blocks of method 600 of FIG. 6.

Although some implementations are described with respect to a single real robot performing real episodes, and a single robotic simulator performing simulated episodes, that is not meant to be limiting. Multiple real robots may perform real episodes (optionally in parallel) and multiple robot simulators may simultaneously perform simulated episodes. However, for the sake of brevity, implementations disclosed herein often refer to a single real robot and a single robotic simulator.

Turning now to FIGS. 2A, 2B, 3A, 3B, and 4 one example of a simulated digit 280A (FIGS. 2A and 2B) of a simulated compliant end effector gripper 280 (FIG. 4) is described and is compared to a corresponding real digit 380A of a corresponding real end effector gripper of a counterpart real robot.

Figure 2A:
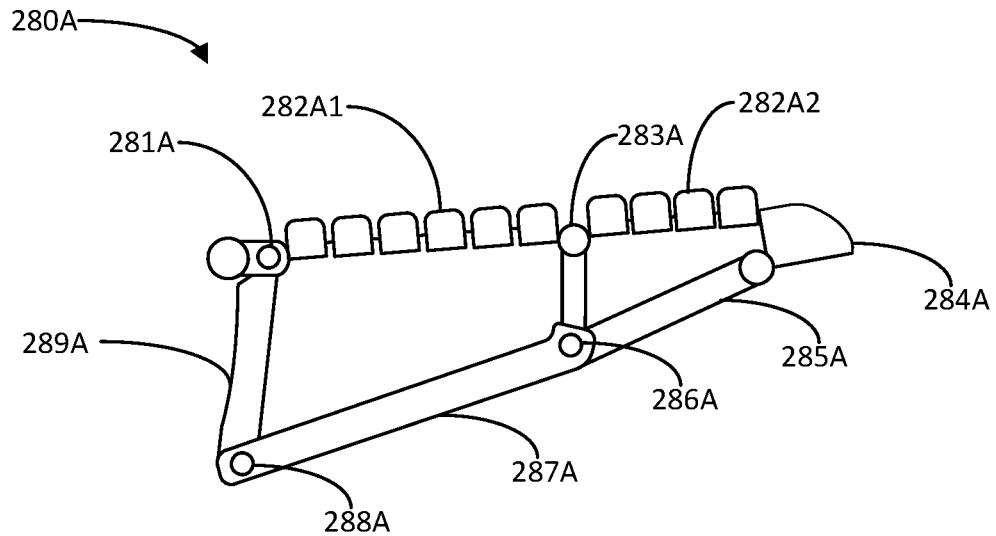
FIG. 2A illustrates an example of a simulated finger/digit of a simulated compliant end effector gripper that can be used with a robotic simulator.
Figure 2B:
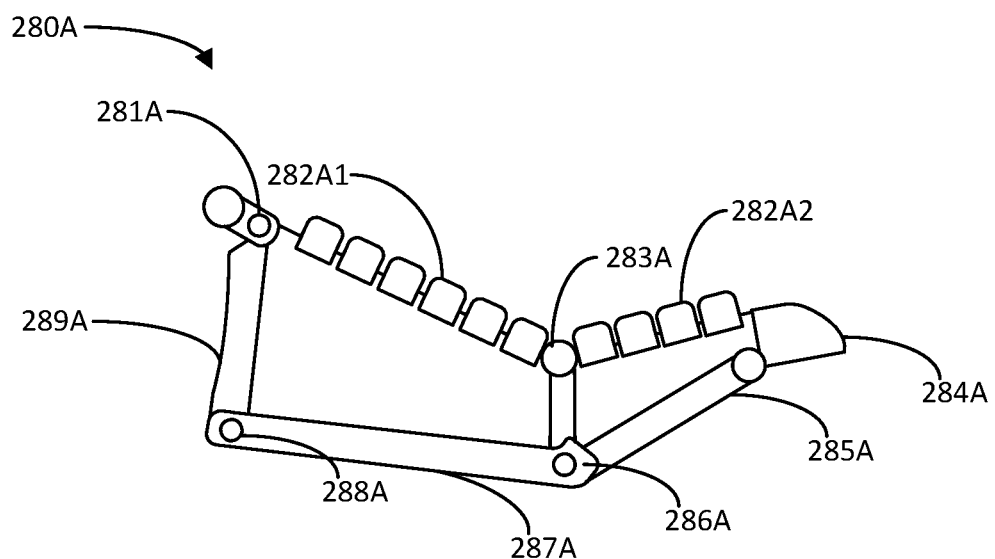
FIG. 2B illustrates an example of how the simulated digit of FIG. 2A can react when a tip thereof contacts a simulated environmental object.

The simulated digit 280A is illustrated in FIGS. 2A and 2B. The simulated digit 280A includes rigid bodies 282A1, 282A2, 284A, 285A, 287A, and 289A. The simulated digit 280A also includes rotational joints 281A, 283A, 286A, and 288A. At least the joint 283A can be a rotational spring joint, whose resistance can vary in dependence on the extent of rotation of the joint 283A and in dependence on a force constant of the rotational spring joint. The other joints 281A, 286A, and 288A can optionally have a fixed resistance, which can be no resistance or a minimal resistance.

The rigid bodies 282A1 and 282A2 collectively correspond to a gripping surface of the simulated digit 280A and each include a plurality of individual members or teeth. More particularly, rigid body 282A1 includes six teeth and rigid body 282A2 includes four teeth. The gripping surface of a digit is one that, when the grasping end effector is grasping an object, is in contact with the object and applying force to the object (optionally along with other digit(s)). The rigid bodies 282A1 and 282A2 are joined by the rotational spring joint 283A, about which the rigid bodies 282A1 and 282A2 can pivot relative to one another (e.g., in one direction). For example, in comparing FIG. 2A to FIG. 2B, it can be seen that the rigid bodies 282A1 and 282A2 pivot toward one another and about the rotational spring joint 283A in response to simulated force being applied at the rigid body 284A that represents the tip of the simulated digit 280A. An extent of the pivoting will be dependent on an extent of the simulated force, as well as an extent of a force constant for the rotational spring joint 283A. As described herein, the force constant can be one that is optimized to cause the simulated digit 280A to be compliant in a manner that mimics the compliance of real digit 380A.

Figure 3A:
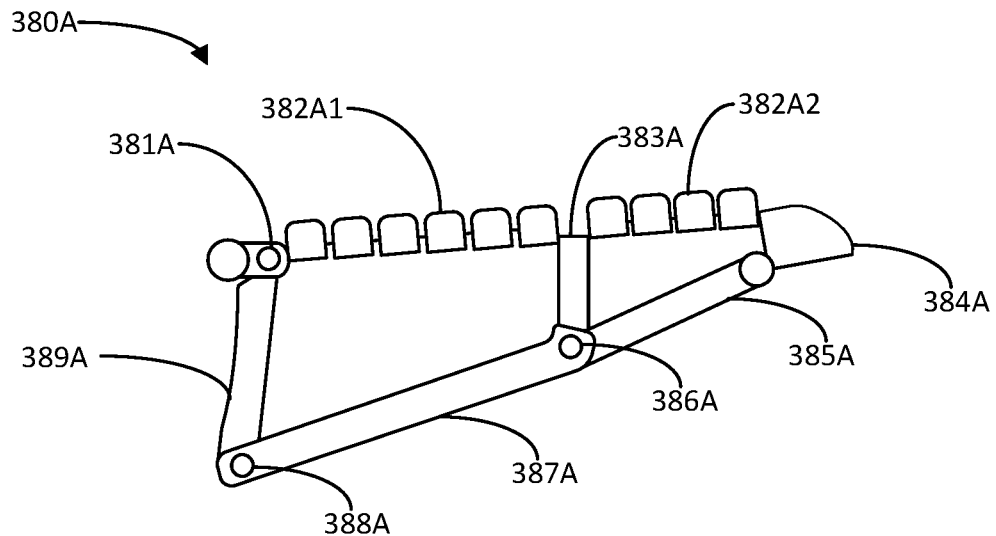
FIG. 3A illustrates an example of a real finger/digit of a real end effector gripper that corresponds to the simulated compliant end effector gripper of FIG. 2A.
Figure 3B:
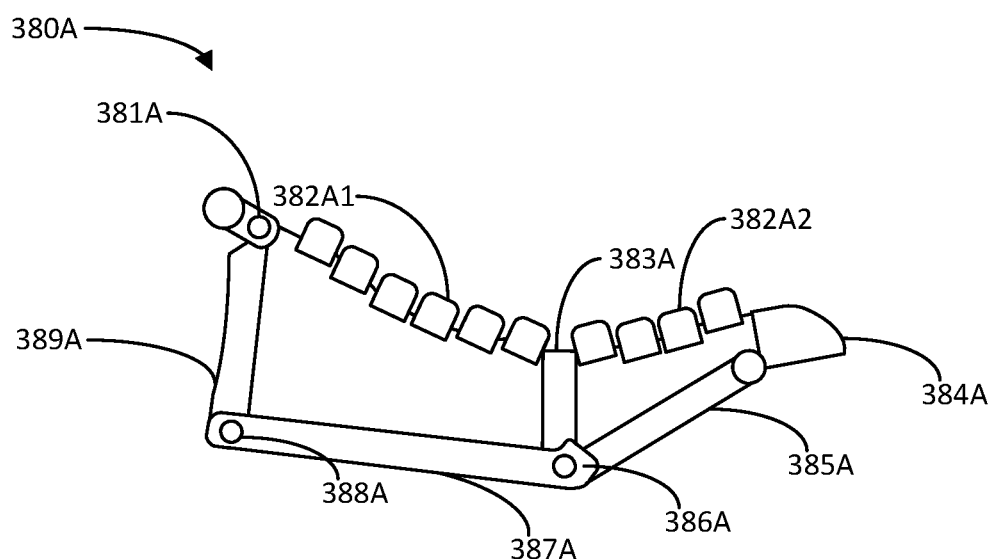
FIG. 3B illustrates an example of how the real digit of FIG. 3A can react when a tip thereof contacts a real environmental object.

The real digit 380A is illustrated in FIGS. 3A and 3B. The real digit 380A includes rigid bodies 384A, 385A, 387A, and 389A, which correspond to rigid bodies of 284A, 285A, 287A, and 289A of simulated digit 280A. The real digit 380A also includes rotational joints 381A, 386A, and 388A, which correspond to rotational joints 281A, 286A, and 288A of simulated digit 280A.

However, instead of rigid bodies, the real digit 380A includes flexible bodies 382A1 and 382A2 that collectively correspond to a gripping surface of the real digit 380A. Moreover, the flexible bodies 382A1 and 382A2 are not joined together with a rotational joint or rotational spring joint. Rather, rigid body support member 383A joins the flexible bodies 382A1 and 382A2, but does not do so with a joint. Since they are flexible and not joined with a rotational spring joint, flexible bodies 382A1 and 382A2 will react differently (relative to rigid bodies 282A1 and 282A2 of simulated digit 280A), when force is applied to rigid body 384A that represents the tip of real digit 380A. For example, in comparing FIG. 3A to FIG. 3B, it can be seen that the flexible bodies 382A1 and 282A2 bend in response to real force being applied at the rigid body 384A that represents the tip of the real digit 380A. An extent of the bending will be dependent on an extent of the real force. In some other implementations, a single flexible body can be provided in lieu of the flexible bodies 382A1 and 382A2, and the rigid support member 383A optionally omitted. In those other implementations, the simulated rigid bodies 282A1, 282A2 and rotational spring joint 283A could still be utilized to simulate the compliance of the single flexible body.

Accordingly, in various implementations described herein, a flexible body or flexible bodies, of a real end effector, can be represented by a simulated end effector with two or more rigid bodies, that are each joined by a rotational spring joint. This can result in the simulated end effector effectively simulating compliance of the flexible body/bodies, despite the simulated end effector including only rigid bodies. It is noted that although the simulated rigid bodies 282A1 and 282A2 of the simulated digit 280A are rigid, while the real flexible bodies 282A1 and 282A2 are flexible, they are otherwise visually similar. Such visual similarity can be beneficial in mitigating the reality gap when simulated data used to train machine learning model(s) captures the simulated end effector. Put another way, having visual similarity between the simulated end effector and the real end effector can help to mitigate the reality gap. It is also noted that, although simulated rigid bodies 282A1, 282A2 and the rotational spring joint 283A are illustrated as simulating the compliance of the single flexible body, implementations can alternatively utilize more simulated rigid bodies and spring joints. For example, the single flexible body can be simulated by three simulated rigid bodies and two rotational springs (e.g., rotational spring 1 interconnecting rigid bodies 1 and 2; and rotational spring 2 interconnecting rigid bodies 2 and 3). Also, for example, the single flexible body can be simulated by four simulated rigid bodies and three rotational springs (e.g., rotational spring 1 interconnecting rigid bodies 1 and 2; rotational spring 2 interconnecting rigid bodies 2 and 3; and rotational spring 2 interconnecting rigid bodies 3 and 4).

Figure 4:
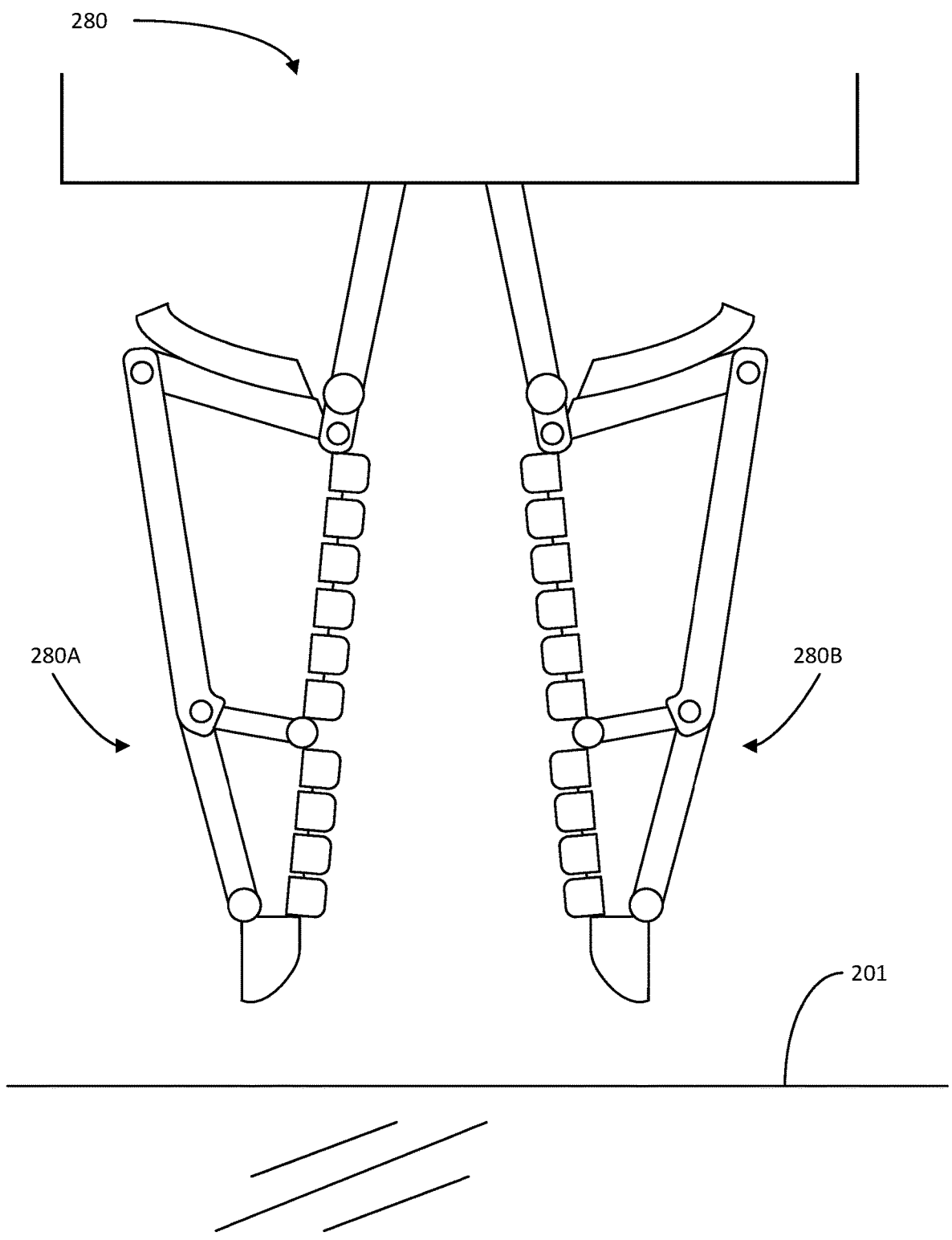
FIG. 4 illustrates an example of a simulated compliant end effector gripper, that includes the simulated digit of FIG. 2A, and an additional opposing simulated digit.

FIG. 4 illustrates an example of a simulated compliant end effector gripper 280, and a simulated surface 201. The simulated compliant end effector gripper 280 includes the simulated digit 280A of FIG. 2A, and an additional simulated digit 280B that is positionally opposed to the simulated digit 280A. The additional simulated digit 280B can be the same as the simulated digit 280A (e.g., includes rigid gripper surfaces joined with a rotational spring joint), but can optionally have a different force constant for the rotational spring. Accordingly, when tips of the simulated digits 280A and 280B contact the simulated surface 201, they can each react in a manner generally consistent with that shown in FIG. 2B. When a simulated grasp is to be attempted, the simulated digits 280A and 280B can be actuated toward one another to cause contact and force to be applied to opposing sides of the corresponding object.

Particular simulated and real end effectors are described with respect to FIGS. 2A, 2B, 3A, 3B, and 4. However, alternative end effectors can be utilized in other implementations, and such alternative end effectors can include simulated portion(s) that represent real flexible portion(s) with simulated rigid bodies and rotational spring(s). As one non-limiting example, a grasping end effector with three, four, or more digits can be provided in various implementations.

Figure 5:
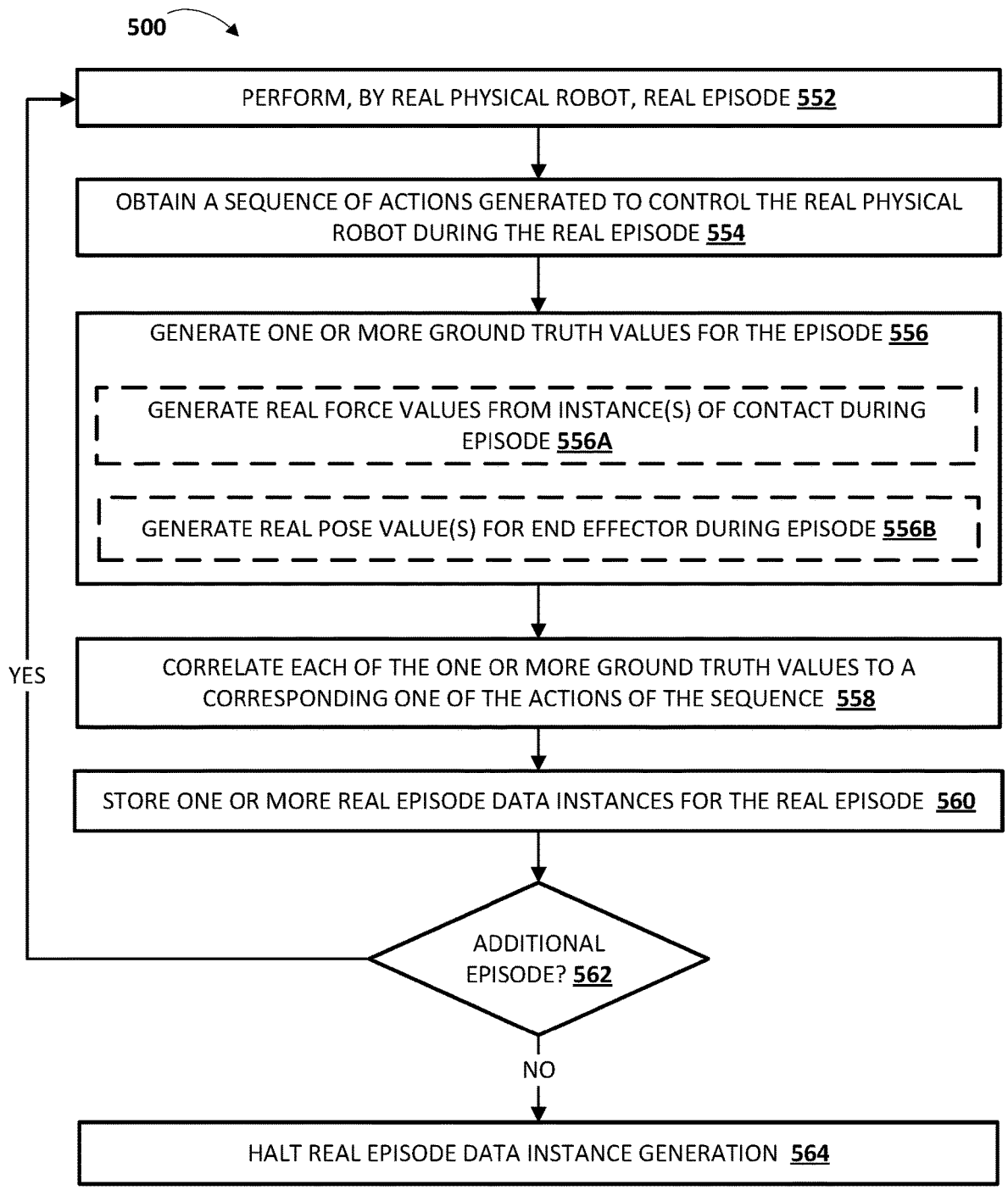
FIG. 5 is a flowchart illustrating an example method of performing real episodes using a real robot, and storing one or more real episode data instances for each of the real episodes according to implementations disclosed herein.

Turning now to FIG. 5, an example method 500 is illustrated of performing real episodes using a real robot, and storing one or more real episode data instances for each of the real episodes. This system may include various components of various computer systems and/or robots, such as one or more components depicted in FIG. 1 (e.g., robot 170 and/or real episode system 110). Moreover, while operations of the method 500 are shown in a particular order, this is not meant to be limiting. One or more operations may be reordered, omitted or added.

At block 552, a real physical robot performs a real episode of a robotic task. For example, the robotic task at a given iteration of block 552 can be a movement task, a navigation task, a picking task, a placing task, a pushing task, and/or other task. In various implementations, the robotic task performed at different iterations of block 552 can vary. For example, some iterations may perform a corresponding real episode of a navigation task, other iterations may perform a corresponding real episode of a grasping task, etc. Moreover, different iterations of block 552 that perform the same robotic task can nonetheless perform different variations of the robotic task. For example, a first iteration of block 552 can perform a grasping task with first environmental objects present and using a first sequence of robotic actions, a second iteration of block 552 2 can perform the grasping task with second environmental objects present and using a second sequence of robotic actions, etc.

At block 554, the system obtains a sequence of actions generated to control the real physical robot during the real episode. The sequence of actions can be, for example, a sequence of joint control forces issued to actuator(s) of the real physical robot, or other low-level control commands. The sequence of actions can include all of the actions generated during the episode, and a quantity of the actions can be dependent, for example, on a duration of the real episode and a control frequency of the real robot. For example, if 20 actions are generated every second during the episode, and the episode is 7 seconds in duration, then a sequence of 140 actions can be obtained for the episode.

At block 556, the system generates one or more ground truth values for the episode. The system can generate the ground state data instance(s) based on, for example, sensor data from sensor(s) of the real physical robot, vision data from a motion capture system, and/or provided human measurements. Block 556 can include sub-block 556A and/or sub-block 556B.

At sub-block 556A, the system generates real force value(s) from instance(s) of contact during the real episode. An instance of contact can be contact of an end effector with a surface that supports an object attempting to be manipulated by the end effector, can be contact of an end effector with the object during the attempted manipulation, and/or other contact. The real force value(s) can be generated based on a force sensor of the real physical robot, such as a force sensor at or near a "wrist" that supports the end effector. The real force value(s) can additionally or alternatively be generated based on force sensor(s) that are on or coupled to the environmental object(s) being interacted with.

At sub-block 556B, the system generates real pose value(s) for the end effector during the episode. For example, the system can generate a real pose value for the end effector based on measured position values for each of the actuators of the robot (e.g., from position sensors of the actuators) at a corresponding point of the episode.

At block 558, the system correlates each of the one or more ground truth values to a corresponding one of the actions of the sequence. For example, the system can use timestamps to correlate ground truth values to corresponding actions.

At block 560, the system stores one or more real episode data instances for the real episode. In some implementations, each real episode is utilized to generate multiple real episode data instances, each covering a unique portion of the real episode. As one example, a first real episode data instance can be generated based on a real episode and can include a sequence of actions from the beginning of the real episode (i.e., robot starting at t=0 seconds from a rest position) to the end of the real episode (i.e., robot has come to a rest position after performing the real episode), along with one or more corresponding ground truth values. Further, a second real episode data instance can be generated based on the same real episode, and include a sequence of actions from the beginning of the real episode to only half-way through the real episode, along with one or more corresponding ground truth values. Yet further, a third real episode data instance can be generated based on the same real episode, and include a sequence of actions from one-third of the way through the real episode to two-thirds of the way through the real episode, along with one or more corresponding ground truth values. In these and other manners, a plurality of real episode data instances can be derived from a single real episode.

At block 562, the system determines whether an additional episode is to be performed by the real robot and/or another real robot. If, at an iteration of block 562, the system determines another episode is to be performed, then the method returns to block 552 to perform an additional episode. The further iteration of block 552 can utilize the same robot or another real robot, can perform the real episode for a different or the same robotic task, and can perform the real episode with different or the same environmental configuration. If, at an iteration of block 562, the system determines another episode is not to be performed, then the method can proceed to block 564 and halt real episode data instance generation.

Figure 6:
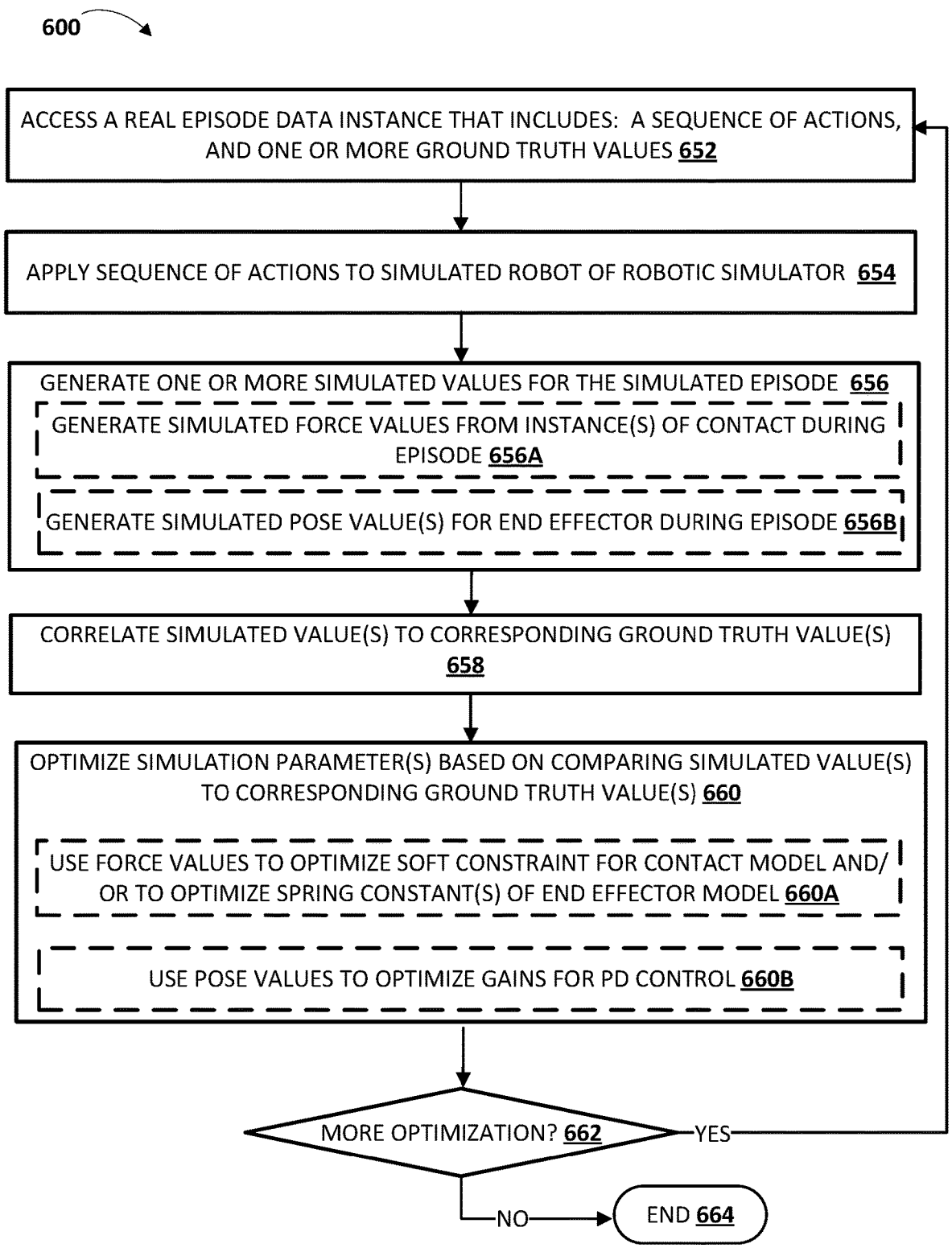
FIG. 6 is a flowchart illustrating an example of performing simulated episode data instances that correspond to real episode data instances, and optimizing simulation parameter(s) based on comparing simulated state data instances to corresponding ground truth state data instances from the real episode data instances.

Turning now to FIG. 6, an example method 600 is illustrated of performing simulated episode data instances that correspond to real episode data instances, and optimizing simulation parameter(s) based on comparing simulated state data instances to corresponding ground truth values from the real episode data instances. For convenience, the operations of the method 600 are described with reference to a system that performs the operations. This system may include various components of various computer systems, such as one or more components depicted in FIG. 1 (e.g., system ID engine 132 and robotic simulator 120). Moreover, while operations of the method 600 are shown in a particular order, this is not meant to be limiting. One or more operations may be reordered, omitted or added.

At block 652, the system accesses a real episode data instance that includes: a sequence of actions, and one or more ground truth values. For example, the system may access a real episode data instance, such as a given one of the real episode data instances stored in real episode data instances 150 of FIG. 1 and/or generated based on method 500 of FIG. 5. In some implementations, the sequence of actions are low-level commands sent to actuator(s) of a real robot during a corresponding real episode. In some implementations, the one or more ground truth values each define measured robot and/or environmental state value(s) at a corresponding point of the real episode. For example, a ground truth value at a corresponding point can include a force value for an end effector of the robot at the corresponding point and/or a pose for the end effector at the corresponding point.

At block 654, the system applies the sequence of actions, of the real episode data instance, to a simulated robot of a robotic simulator. In some implementations, prior to block 654, the system can configure a simulated environment, of the robotic simulator, based on environmental data that is optionally included in the real episode data instance.

At block 656, the system generates one or more simulated values for the simulated episode that results from applying the sequence of actions to the simulated robot at block 654. Block 656 can sub-block 656A and/or sub-block 656B.

At sub-block 656A, the system generates simulated force value(s) from instance(s) of contact during the simulated episode. An instance of contact can be contact of a simulated end effector with a simulated surface that supports a simulated object attempting to be manipulated by the simulated end effector, can be contact of a simulated end effector with the object during the attempted manipulation, and/or other contact. The simulated force value(s) can be generated directly by the robotic simulator.

At sub-block 656B, the system generates simulated pose value(s) for the end effector during the simulated episode. The simulated pose value(s) can be generated directly by the robotic simulator.

At block 658, the system correlates the simulated value(s) (generated at block 656) to corresponding ground truth value(s) (from the real episode data instance). For example, a first simulated force value can be correlated to a first ground truth force value based on both occurring at the same points in the respective episodes (real and simulated). Likewise, a second simulated force value can be correlated to a second ground truth force value based on both occurring at the same points in the respective episodes.

At block 660, the system optimizes simulation parameter(s) based on comparing simulated value(s) to the corresponding ground truth value(s). For example, a loss can be generated based on comparing real world value(s) to corresponding simulated value(s), and that loss can be utilized by VIZIER or another black-box optimizer to determine, based on the loss, an updated parameter that can be considered more optimized relative to an initial parameter or a parameter determined in a most recent iteration of block 660. Block 660 can include sub-blocks 660A and/or 660B.

At sub-block 660A, the system uses force values to optimize a soft constraint for a simulated contact model utilized by the robotic simulator and/or to optimize spring constant(s) for simulated spring(s) of a simulated end effector model utilized by the robotic simulator. For example, a loss can be generated based on comparing real world force value(s) to corresponding simulated force value(s), and that loss can be utilized by a black-box optimizer to determine, based on the loss, an updated soft constraint and/or force constant.

At sub-block 660B, the system uses pose values to optimize gain(s) for PD control utilized by a control engine of the robotic simulator. For example, a loss can be generated based on comparing real world pose value(s) to corresponding simulated pose value(s), and that loss can be utilized by a black-box optimizer to determine, based on the loss, updated gain(s).

At block 662, the system determines whether to continue optimization of the simulation parameter(s). If, at an iteration of block 662, the system determines to continue optimization, then the system returns to block 652 and accesses an additional real episode data instance. The system then performs an additional iteration of blocks 654, 656, 658, and 660. It is noted that, in the additional iteration of blocks 654 and 656, most recently optimized simulation parameter(s) can be utilized. Put another way, the simulation parameter(s) that are utilized in the additional iteration can be those as most recently optimized in a prior iteration of block 660.

If, at an iteration of block 662, the system determines to not continue optimization, then the system proceeds to block 664 and method 600 ends. The simulation parameter(s), as optimized when the method 600 ends, can then be utilized in generating simulated data that can be used to train one or more machine learning models to be deployed on a counterpart real robot.

At block 662, the system can determine whether to continue optimization based on whether one or more conditions have been satisfied. The one or more conditions can include a threshold quantity of iterations, convergence of the parameter(s) being optimized, and/or other condition(s).

It is noted that, in some implementations, iterations of method 600 can be performed to optimize a subset of simulation parameter(s) then, once such subset is optimized, further iterations of method 600 can be performed to optimize a different subset of simulation parameter(s). For example, gain(s) for PD control can be optimized initially, then a soft constraint and/or a force constant optimized after the gain(s) are optimized. For instance, the gains can be fixed during the iterations of the method 600 in which the soft constraint and/or the force constant are being optimized.

Figure 7:
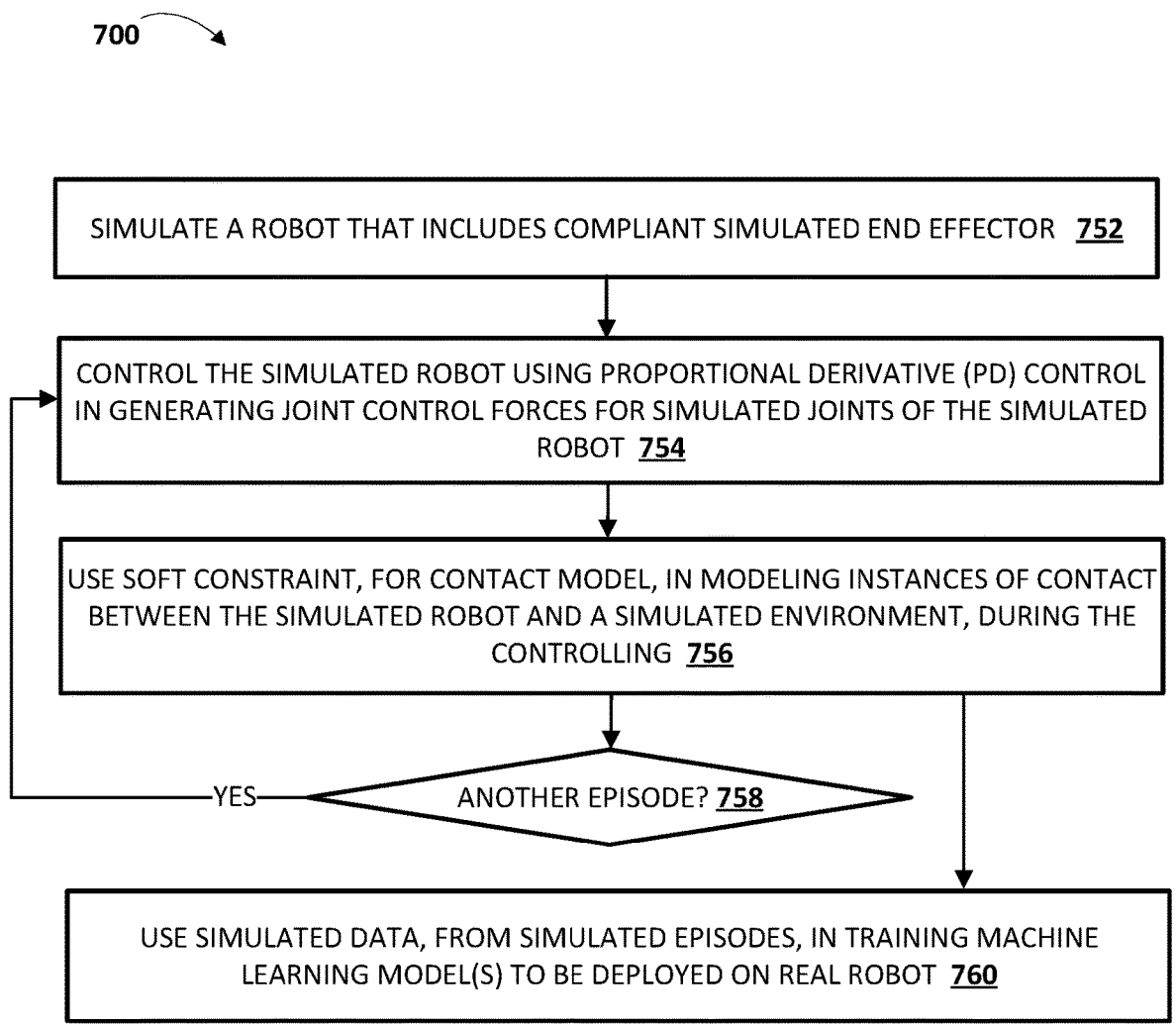
FIG. 7 is a flowchart illustrating an example method of performing simulated episodes utilizing technique(s) that enable compliant robotic control and/or compliant robotic contact to be simulated effectively, and using resulting simulated data in training machine learning model(s) to be deployed on a real robot.

FIG. 7 is a flowchart illustrating an example method 700 of performing simulated episodes utilizing technique(s) that enable compliant robotic control and/or compliant robotic contact to be simulated effectively, and using resulting simulated data in training machine learning model(s) to be deployed on a real robot. This system may include various components of various computer systems, such as one or more components depicted in FIG. 1 (e.g., robotic simulator 120 and training engine 145). Moreover, while operations of the method 700 are shown in a particular order, this is not meant to be limiting. One or more operations may be reordered, omitted or added.

At block 752, the system simulates a robot that includes a compliant simulated end effector. The compliant end effector model corresponds to a real end effector of a counterpart real robot. The utilized simulated end effector can include a simulated portion that corresponds to a real portion of the real end effector, where the real portion is deformable. For example, the real portion can be one or more flexible plastic bodies, flexible rubber bodies, and/or other flexible body or bodies. Despite the simulated portion corresponding to the real portion, it can differ from the real portion so as to be utilizable in simulation, while still accurately simulating the compliance of the real portion. For example, the real portion can include one or more real flexible bodies, while the simulated portion can instead include only simulated rigid bodies with simulated rotational spring(s) or other simulated resistive joint interconnecting the simulated rigid bodies. In these and other manners, simulated compliance of the end effector can be achieved in simulation, despite some or all portions thereof being modeled as rigid bodies/links. As described herein, a force constant of a simulated rotational spring of a compliant end effector model can optionally be determined utilizing system identification and/or other optimization technique(s) (e.g., using method 600).

At block 754, the system controls the simulated robot using PD control in generating joint control forces for simulated joints of the simulated robot. The system further controls the simulated robot based on the joint control forces generated using the PD control. In some of those implementations, PD control is utilized and the joint control forces are solved explicitly. This can result in less stiff control that corresponds more closely with real world control. The PD control gains that are utilized can be optimized as described herein (e.g., using method 600) so as to avoid overshoot and/or instability.

At block 756, the system uses a soft constraint, for the simulated contact model, in modeling instances of contact between the simulated robot and a simulated environment, during the controlling of block 754. Using the soft constraint enables penetration of the simulated end effector into simulated environmental objects during instances of contact. In some implementations, the soft constraint can be controlled by an ERP value or a CFM value. In some of those implementations, the contact model is implemented in simulation as an LCP together with other constraint(s) (e.g. joint limit constraint(s)) and is solved with sequential impulse (e.g., using a PGS solver). As described herein, the soft constraint utilized in the contact model during simulation can optionally be determined utilizing system identification and/or other optimization technique(s) (e.g., using method 600).

One or more iterations of blocks 754 and 756 occur during performance of a simulated episode. When the simulated episode terminates (e.g., due to a time or iteration threshold, completing a goal, or other termination condition), the system proceeds to block 758 and determines whether to perform another simulated episode. If so, the system proceeds to block 754 and performs another episode through iterations of blocks 754 and 756. As described herein, environmental conditions can optionally be altered amongst different episodes. At block 758, the system can determine whether to perform another simulated episode based on whether a threshold quantity of simulated episodes have been performed, based on whether corresponding machine learning model(s) (of block 760, described below) have been trained, and/or based on one or more other criteria.

At block 760, the system uses simulated data, from the simulated episodes of iterations of blocks 774 and 776, in training machine learning model(s) to be deployed on a counterpart real robot. The training can occur simultaneous with the generating of simulated data (e.g., when training a model on-policy) and/or can occur after the simulated data has been generated (e.g., using stored instances of the simulated data).

FIG. 7 schematically depicts an example architecture of a robot 725. The robot 725 includes a robot control system 760, one or more operational components 740a-740n, and one or more sensors 742a-742m. The sensors 742a-742m may include, for example, vision components, light sensors, pressure sensors, pressure wave sensors (e.g., microphones), proximity sensors, accelerometers, gyroscopes, thermometers, barometers, and so forth. While sensors 742a-742m are depicted as being integral with robot 725, this is not meant to be limiting. In some implementations, sensors 742a-742m may be located external to robot 725, e.g., as standalone units.

Operational components 740a-740n may include, for example, one or more end effectors and/or one or more servo motors or other actuators to effectuate movement of one or more components of the robot. For example, the robot 725 may have multiple degrees of freedom and each of the actuators may control actuation of the robot 725 within one or more of the degrees of freedom responsive to the control commands. As used herein, the term actuator encompasses a mechanical or electrical device that creates motion (e.g., a motor), in addition to any driver(s) that may be associated with the actuator and that translate received control commands into one or more signals for driving the actuator. Accordingly, providing a control command to an actuator may comprise providing the control command to a driver that translates the control command into appropriate signals for driving an electrical or mechanical device to create desired motion.

The robot control system 760 may be implemented in one or more processors, such as a CPU, GPU, and/or other controller(s) of the robot 725. In some implementations, the robot 725 may comprise a "brain box" that may include all or aspects of the control system 760. For example, the brain box may provide real time bursts of data to the operational components 740a-740n, with each of the real time bursts comprising a set of one or more control commands that dictate, inter alia, the parameters of motion (if any) for each of one or more of the operational components 740a-740n. In some implementations, the robot control system 760 may perform one or more aspects of one or more methods described herein.

As described herein, in some implementations all or aspects of the control commands generated by control system 760 can be generated based on a machine learning model that is trained, in whole or in part, based on simulated training data generated according to techniques described herein. Although control system 760 is illustrated in FIG. 7 as an integral part of the robot 725, in some implementations, all or aspects of the control system 760 may be implemented in a component that is separate from, but in communication with, robot 725. For example, all or aspects of control system 760 may be implemented on one or more computing devices that are in wired and/or wireless communication with the robot 725, such as computing device 810.

Figure 8:
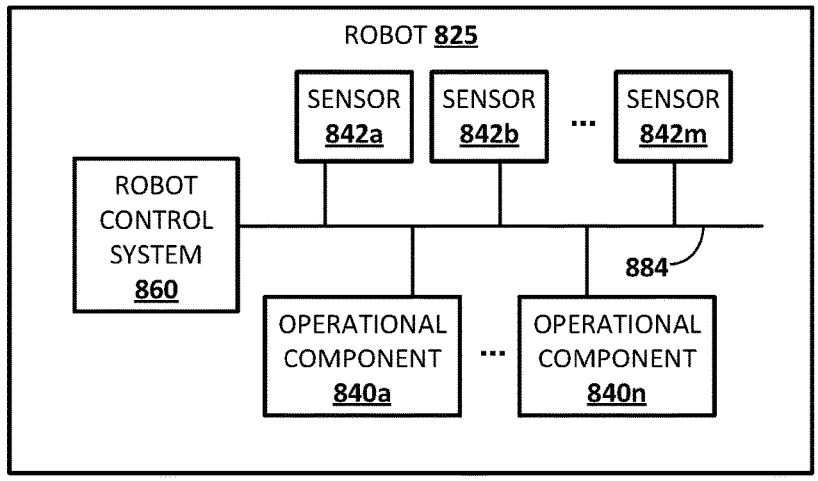
FIG. 8 schematically depicts an example architecture of a robot.
Figure 9:
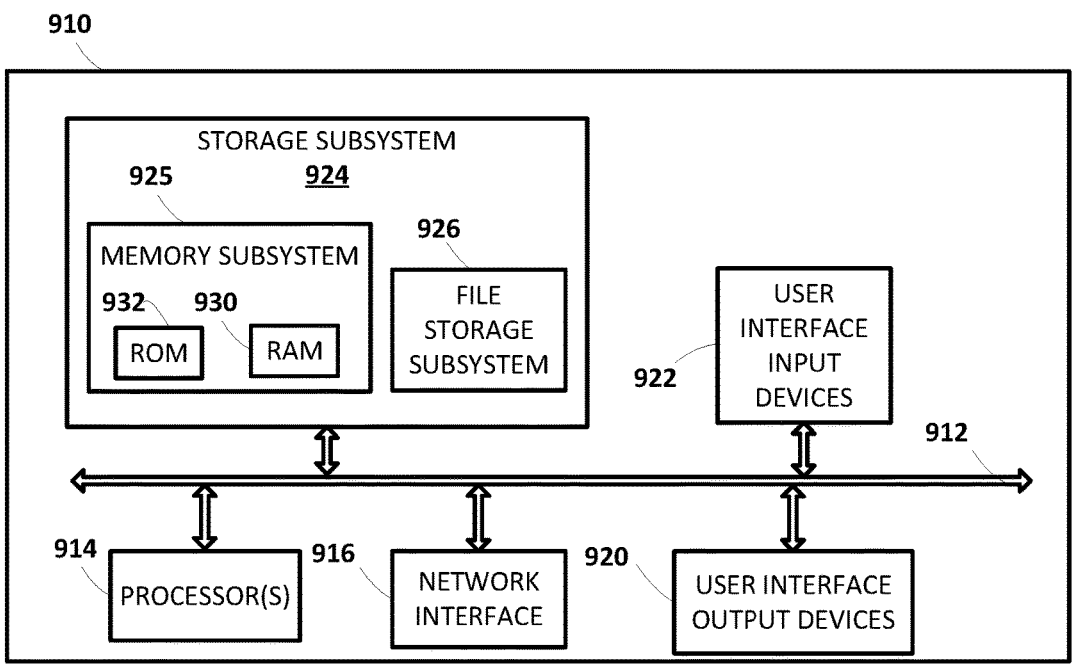
FIG. 9 schematically depicts an example architecture of a computer system.

FIG. 8 is a block diagram of an example computing device 810 that may optionally be utilized to perform one or more aspects of techniques described herein. For example, in some implementations computing device 810 may be utilized to execute simulator 120, system ID engine 132, real episode system 110, sim training data system 140, and/or training engine 145. Computing device 810 typically includes at least one processor 814 which communicates with a number of peripheral devices via bus subsystem 812. These peripheral devices may include a storage subsystem 824, including, for example, a memory subsystem 825 and a file storage subsystem 826, user interface output devices 820, user interface input devices 822, and a network interface subsystem 816. The input and output devices allow user interaction with computing device 810. Network interface subsystem 816 provides an interface to outside networks and is coupled to corresponding interface devices in other computing devices.

User interface input devices 822 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device 810 or onto a communication network.

User interface output devices 820 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 810 to the user or to another machine or computing device.

Storage subsystem 824 stores programming and data constructs that provide the functionality of some or all of the modules described herein. For example, the storage subsystem 824 may include the logic to perform selected aspects of one or more methods described herein.

These software modules are generally executed by processor 814 alone or in combination with other processors. Memory 825 used in the storage subsystem 824 can include a number of memories including a main random access memory (RAM) 830 for storage of instructions and data during program execution and a read only memory (ROM) 832 in which fixed instructions are stored. A file storage subsystem 826 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 826 in the storage subsystem 824, or in other machines accessible by the processor(s) 814.

Bus subsystem 812 provides a mechanism for letting the various components and subsystems of computing device 810 communicate with each other as intended. Although bus subsystem 812 is shown schematically as a single bus, alternative implementations of the bus subsystem may use multiple busses.

Computing device 810 can be of varying types including a workstation, server, computing cluster, blade server, server farm, or any other data processing system or computing device. Due to the ever-changing nature of computers and networks, the description of computing device 810 depicted in FIG. 8 is intended only as a specific example for purposes of illustrating some implementations. Many other configurations of computing device 810 are possible having more or fewer components than the computing device depicted in FIG. 8.

What is claimed is:

1. A method implemented by one or more processors, the method comprising:
performing a simulated episode, using a robotic simulator that includes a simulated environment and a simulated robot that simulates a counterpart real robot, wherein performing the simulated episode comprises:
simulating an end effector, of the simulated robot, that corresponds to a real end effector of the counterpart real robot, wherein the simulated end effector, simulated in the simulated episode, comprises a simulated portion that corresponds to a real portion of the real end effector, and wherein the simulated portion comprises:
at least two simulated rigid bodies that are joined with at least one rotational spring, wherein the at least two simulated rigid bodies that are joined with the at least one rotational spring simulate one or more real deformable bodies, of the real portion of the real end effector of the real robot, wherein the one or more real deformable bodies are not joined with any rotational spring; and
controlling the simulated robot to cause one or more instances of contact of the simulated end effector with one or more simulated environmental objects of the environment;
using simulated data, from the simulated episode, in training one or more machine learning models to be deployed on the counterpart real robot with the real end effector having the one or more real deformable bodies that are not joined with any rotational spring.

2. The method of claim 1, wherein performing the simulated episode further comprises:
using, during the simulated episode, a soft constraint for a contact constraint of a simulated contact model of the robotic simulator,
wherein using the soft constraint enables penetration of the simulated end effector into the one or more simulated environmental objects during the one or more instances of contact.

3. The method of claim 2, wherein the soft constraint is controlled by an error reduction parameter (ERP) or a constraint force mixing (CFM) value.

4. The method of claim 2, further comprising:
performing a system identification to determine the soft constraint, wherein performing the system identification comprises:
generating the soft constraint based on performing an optimization based on comparisons of:
real world force values from real instances of contact of the real end effector with real world objects, and
simulated force values from corresponding simulated instances of contact of the simulated end effector with corresponding simulated objects.

5. The method of claim 4, further comprising:
determining at least one force constant, for the at least one rotational spring, based on performing the optimization and along with determining the soft constraint.

6. The method of claim 4, wherein controlling the simulated robot comprises:
using proportional derivative (PD) control in generating joint control forces for simulated joints of the simulated robot; and
controlling the simulated robot based on the joint control forces generated using the PD control.

7. The method of claim 6, further comprising:
performing an additional system identification to determine gains for the PD control, wherein performing the additional system identification comprises:
generating the gains for the PD control based on performing an additional optimization based on comparisons of:
real pose values of the counterpart real robot during corresponding control episodes of the counterpart real robot, and
simulated pose values from corresponding simulated episodes of the simulated robot.

8. The method of claim 7, wherein performing the additional system identification to determine the gains for the PD control occurs subsequent to performing the system identification to determine the soft constraint.

9. The method of claim 1, wherein controlling the simulated robot comprises:
using proportional derivative (PD) control in generating joint control forces for simulated joints of the simulated robot; and
controlling the simulated robot based on the joint control forces generated using the PD control.

10. The method of claim 9, further comprising:
performing a system identification to determine gains for the PD control, wherein performing the system identification comprises:
generating the gains for the PD control based on performing an optimization based on comparisons of:
real pose values of the counterpart real robot during corresponding control episodes of the counterpart real robot, and
simulated pose values from corresponding simulated episodes of the simulated robot.

11. The method of claim 1, wherein the simulated end effector is a simulated end effector gripper having a plurality of simulated digits, wherein the simulated portion is a simulated digit of the plurality of simulated digits, wherein the real end effector is a real end effector gripper having a plurality of real digits, and wherein the real portion is a real digit of the plurality of real digits.

12. The method of claim 11, wherein the one or more real deformable bodies are all or part of a gripping surface of the real digit.

13. The method of claim 12, wherein the one or more real deformable bodies consist of a single real deformable body.

14. The method of claim 1, further comprising:
training the one or more machine learning models based on the simulated training data; and
transmitting the one or more machine learning models for use in control of the counterpart real robot.

15. The method of claim 1, wherein the at least two simulated rigid bodies include four rigid bodies and wherein the at least one rotational spring includes three rotational springs, wherein each of the three rotational springs interconnects a corresponding pair of the four rigid bodies.

16. A method implemented by one or more processors, the method comprising:
performing a system identification to determine gains for proportional derivative (PD) control of a simulated robot that simulates a counterpart real robot, wherein performing the system identification comprises:
generating the gains for the PD control based on performing an optimization based on comparisons of:

simulated pose values from corresponding simulated episodes of the simulated robot; and real pose values of the counterpart real robot during corresponding control episodes of the counterpart real robot;

performing a simulated episode, using a robotic simulator that includes a simulated environment and the simulated robot that simulates the counterpart real robot, wherein performing the simulated episode comprises:

simulating an end effector, of the simulated robot, that corresponds to a real end effector of the counterpart real robot;

controlling the simulated robot to cause one or more instances of contact of the simulated end effector with the one or more simulated environmental objects of the environment, wherein controlling the simulated robot comprises:

using PD control, with the determined gains, in generating joint control forces for simulated joints of the simulated robot; and controlling the simulated robot based on the joint control forces generated using the PD control; and using simulated data, from the simulated episode, in training one or more machine learning models to be deployed on the counterpart real robot.

17. The method of claim 16, wherein performing the simulated episode further comprises:

using, during the simulated episode, a soft constraint for a contact constraint of a simulated contact model of the robotic simulator, wherein using the soft constraint enables penetration of the simulated end effector into the one or more simulated environmental objects during the one or more instances of contact.

18. The method of claim 17, wherein the soft constraint is controlled by an error reduction parameter (ERP) or a constraint force mixing (CFM) value.

19. The method of claim 18, further comprising:

performing a system identification to determine the soft constraint, wherein performing the system identification comprises:

generating the soft constraint based on performing an optimization based on comparisons of:

real world force values from real instances of contact of the real end effector with real world objects, and simulated force values from corresponding simulated instances of contact of the simulated end effector with corresponding simulated objects.

* * * * *